United States Patent Office 3,544,378
Patented Dec. 1, 1970

3,544,378
FUEL CELL COMPRISING A METAL TUNGSTATE ANODE
Barret Broyde, New York, N.Y., assignor to Esso Research and Engineering Company, a corporation of Delaware
No Drawing. Filed Dec. 29, 1966, Ser. No. 605,553
Int. Cl. H01m 13/00, 27/00
U.S. Cl. 136—86                                  11 Claims The present invention concerns non-noble metal electrocatalysts. In general, it relates to non-noble metal anodic oxidation catalysts for use in electrochemical cells. In particular, it concerns the use of certain tungsten bronzes as catalysts for the anodic oxidation of a fuel in a fuel cell.

As used herein, the term "electrochemical cells" refers both to fuel cells and electrolytic cells.

The term "fuel cell" is used herein and in the art to denote a device, system or apparatus wherein the chemical energy of a fluid (i.e. gaseous or liquid) combustible fuel, e.g., hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into contact with the anode and electrolyte and means for admitting a fluid oxidant into dual contact with the cathode and electrolyte. When necessary or desired, the electrolyte compartment is divided into an anolyte compartment and a catholyte compartment, e.g. by an ion-permeable partition or ion-exchange membrane. Thus, in each such fuel cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series or in both series and parallel.

The term "electrolytic cell" is used herein and in the art to denote a device, system or apparatus which unlike the aforementioned fuel cell does not provide a net production of electrical energy but does provide for the anodic oxidation of an organic fuel at the anode of the cell. In such cells a direct current of electrical energy from an external source, e.g., a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g., conversion of alcohols to ketones, hydrocarbons to carboxylic acids, etc.

In most of the cells of the type hereinbefore described, catalysts are employed to promote the reactions within the cell. In general, the catalysts associated with the anode reaction are noble metal, e.g. platinum, catalysts. These catalysts are usually an integral part of the anode but in some applications the catalysts are not a part of the anode. For example, the catalysts may be employed in the form of an electrolyte slurry. Because of the expensiveness of noble metal catalysts, continuing efforts have been made to find effective non-noble metal catalysts which are suitable for use as anodic oxidation catalysts in electrochemical cells.

In addition to exhibiting anodic oxidation catalytic activity, a material to be suitable for use as such a catalyst in an electrochemical cell must also exhibit certain other properties. For example, the material must be electrically conductive and in addition must be resistant to attack from the electrolyte employed within the cell. Many cells employ acidic electrolytes since such electrolytes reject carbon dioxide, and thus the material which is conductive and catalytic must also be resistant to acid corrosion in order for the material to be a suitable anodic oxidation catalyst.

It has now been discovered that certain tungsten bronzes are very effective anodic oxidation catalysts.

The term "tungsten bronze" is used herein to represent any one of a series of nonstoichiometric compounds of the formula $M_xWO_3$ in which M is a rare earth metal (Ce, Pr, Nd, Pm, Sm, Eu, Gd, Tb, Dy, Ho, Er, Tm, and Yb) and $x$ has a value between 0 and 1, e.g. 0.1 to 0.2.

The term "anodic oxidation catalysts" is employed herein to include catalysts which are associated with the anode reaction (as contrasted to the cathode) of an electrochemical cell. As mentioned above, such catalysts may or may not be an integral part of the anode.

Various tungsten bronzes have been reported in the literature, for example, Sienko, Advances in Chemistry No. 39, Nonstoichiometric Compounds, The American Chemicals Society, 1963, p. 224 reviews the preparation of alkali metal tungsten bronzes and discusses some of their electric and magnetic properties. The preparation of rare earth tungsten bronzes is reported by Ostertag, Inorganic Chemistry, V., 1965, p. 758. However, nowhere in the prior art has there been reported that rare earth tungsten bronzes are very effective catalysts for the anodic oxidation of a fluid fuel.

The rare earth tungsten bronze anodic oxidation catalysts of the present invention have the formula $M_xWO_3$ where M is a rare earth metal and $x$ has a value of about 0 to 1.

The catalysts of the present invention are prepared, for example, from a mixture of rare earth oxide, tungsten metal, and tungsten trioxide. The relative amount of each compound which is present in the mixture is dictated by the stoichiometric formula desired. The mixture is pressed into pellets and heated under high temperatures and vacuum for several hours. The pellets are powdered giving a catalytic powder which X-ray analysis indicates has a cubic form corresponding to a rare earth tungsten bronze.

The catalytic powder may be fabricated, for example, into a catalytic anode by compressing the powder onto a conductive support material such as a metal screen with or without the use of a binder and/or wetproofing agents such as Teflon.

The anodic oxidation catalysts of the present invention may be employed in electrochemical cells using acidic electrolytes such as sulfuric or phosphoric acids; buffer electrolytes such as aqueous or molten phosphates, borates, carbonates and the like. If used in alkali electrolytes the catalysts are attacked after a comparatively short period of time.

The anodic oxidation catalysts of the present invention may be employed for the anodic oxidation of both electrolyte soluble and insoluble carbonaceous fuels such as ethane, ethylene, butane, decane and other saturated or unsaturated hydrocarbons, methanol, methylene glycol, formaldehyde or oxygenated carbonaceous fuels. In addition, the catalysts are effective for hydrogen containing fuels such as hydrogen, ammonia, hydrazine and the like.

The present invention may be further illustrated by reference to the following examples which are included for illustrative purposes only and not intended to limit the scope of the invention in any respect.

EXAMPLE 1.—EUROPIUM TUNGSTEN BRONZE

Europium tungsten bronze having the formula $Eu_{0.1}WO_3$ was tested as a catalyst for the anodic oxidation of hydrogen. The catalyst was obtained by mixing europium oxide, tungsten metal and tungsten trioxide together in stoichiometric proportions and pressing into pellets. The pellets were put into a quartz test tube, evacuated on a vacuum pump, and the tube sealed under vacum. The sealed evacated test tube was heated in a Leco tube furnace for 72 hours at 1100° C. After the tube cooled, it was broken open and the resulting blue pellets were powdered and passed through a 325 mesh screen. X-ray analysis showed a cubic form indicating europium tungsten bronze. The catalytic powder was fabricated into an anode with a Teflon emulsion on a tantalum screen by using 1 gram of europium tungsten bronze ($Eu_{0.1}WO_3$), 0.2 cc. of Teflon 42 emulsion, and a 50 mesh tantalum screen. The catalyst loading was 200 mg./cm.$^2$.

The catalytic anode was tested in a half-cell employing 30% aqueous sulfuric acid at a temperature of about 90° C. as the electrolyte. The following data were obtained.

| Current, ma./5 cm.$^2$ | Fuel | Volts [1] |
|---|---|---|
| 0.235 | $N_2$ | 0.54 |
| 0.640 | $H_2$ | 0.54 |
| 0.28 | $N_2$ | 0.94 |
| 0.85 | $H_2$ | 0.94 |

[1] Polarized from theoretical hydrogen potential.

EXAMPLE 2.—CERIUM TUNGSTEN BRONZE

Cerium tungsten bronze having the formula $Ce_{0.1}WO_3$ was tested for anodic oxidation activity. Catalytic powder of cerium tungsten bronze was prepared in essentially the same manner as in Example 1 using cerium dioxide, tungsten and tungsten trioxide. 1 gram of the resulting powder was fabricated into a catalytic anode with 0.05 cc. of Teflon 42 emulsion and a tantalum screen, at a catalyst loading of 200 mg./cm.$^2$. The catalytic anode was tested in a half-cell employing (1) 30% aqueous sulfuric acid at about 90° C. and (2) 85% aqueous phosphoric acid at about 140° C. as the electrolytes. The following data were obtained.

| Current, ma./cm.$^2$ | Fuel | Electrolyte | Volts [1] |
|---|---|---|---|
| −2.3 | $N_2$ | 1 | 0.20 |
| +0.2 | $H_2$ | 1 | 0.20 |
| 0 | $N_2$ | 1 | 0.40 |
| 1.5 | $H_2$ | 1 | 0.40 |
| 0.34 | $N_2$ | 1 | 0.60 |
| 1.5 | $H_2$ | 1 | 0.60 |
| 0.30 | $N_2$ | 1 | 0.80 |
| 1.5 | $H_2$ | 1 | 0.80 |
| 0 | $N_2$ | 2 | 0.4 |
| 0.5 | $H_2$ | 2 | 0.4 |
| 0.8 | $N_2$ | 2 | 0.94 |
| 1.4 | $H_2$ | 2 | 0.94 |

[1] Polarized from theoretical hydrogen potential.

EXAMPLE 3.—HOLMIUM TUNGSTEN BRONZE

Holmium tungsten bronze having the formula $Ho_{0.1}WO_3$ was prepared by essentially the same process as described in Examples 1 and 2 and tested for anodic oxidation activity. The following data were obtained.

| Current, ma./cm.$^2$ | Fuel | Volts [1] |
|---|---|---|
| 0.01 | $N_2$ | 0.94 |
| 0.24 | $H_2$ | 0.94 |

[1] Polarized from theoretical hydrogen potential.

EXAMPLE 4.—DYSPROSIUM TUNGSTEN BRONZE

Dysprosium tungsten bronze having the formula $Dy_{0.1}WO_3$ was prepared by essentially the same process as described in Examples 1 and 2 and tested for anodic oxidation activity. The following data were obtained.

| Current, ma./cm.$^2$ | Fuel | Volts [1] |
|---|---|---|
| 0.01 | $N_2$ | 0.94 |
| 0.10 | $H_2$ | 0.94 |

[1] Polarized from theoretical hydrogen potential.

EXAMPLE 5.—SAMARIUM TUNGSTEN BRONZE

Samarium tungsten bronze having the formula $Sm_{0.1}WO_3$ was prepared by essentially the same process as described in Examples 1 and 2 and tested for anodic oxidation activity. The following data were obtained.

| Current, ma./cm.$^2$ | Fuel | Volts [1] |
|---|---|---|
| 0.00 | $N_2$ | 0.80 |
| 0.09 | $H_2$ | 0.80 |

[1] Polarized from theoretical hydrogen potential.

Many tungsten bronzes other than the rare earth tungsten bronzes of the present invention do not exhibit the requisite properties of an anodic oxidation catalyst. For example, alkali metal bronzes, in particular sodium tungsten bronze does not exhibit anodic oxidation activity for either hydrogen or ethylene. In addition, the following tungsten bronzes exhibited no anodic oxidation activity: $Na_{0.8}WO_3$, $Y_{0.1}WO_3$, $La_{0.1}WO_3$, $Hf_{0.2}WO_3$, $Ta_{0.2}WO_3$, $Nb_{0.2}WO_3$, $Mo_{0.2}WO_3$, $Cu_{0.2}WO_3$, $Cu_{0.08}WO_3$, $Ag_{0.2}WO_3$, $Ag_{0.01}WO_3$, $In_{0.2}WO_3$, $Sn_{0.2}WO_3$, $Tl_{0.2}WO_3$ and $Tl_{0.35}WO_3$.

As mentioned above, the rare earth tungsten bronze anodic oxidation catalysts of the present invention may be fabricated in various manners to prepare catalytic anodes. While the patricular method of fabrication will to some degree effect the performance of the catalytic anode, that aspect of the present invention which is concerned with catalytic anodes is not limited to any particular method of anode fabrication. In addition, it is possible that some of the rare earth tungsten bronzes will exhibit greater or lesser anodic oxidation activity than others with respect to different fuels. However, the present invention is not to be limited in this respect. Many modifications of the present disclosure will be obvious to those skilled in the art. It is intended that the spirit of the present invention be limited only by the following claims.

What is claimed is:

1. An electrochemical cell, comprising an anode, a cathode, and an electrolyte therebetween, said anode consisting essentially of an electrically conductive base support and an anodic oxidation catalyst having the formula:

$$M_xWO_3$$

where M is selected from the group consisting of Ce, Pr, Nd, Pm, Sm, Eu, Gd, Tb, Dy, Ho, Er, Tm and Yb, and $x$ has a value between 0 and 1.

2. An electrochemical cell as in claim 1 wherein such cell is a fuel cell.

3. The electrochemical cell of claim 2 wherein $x$ has a value 0.1 to 0.2.

4. A fuel cell as in claim 2 wherein the electrolyte is selected from the group consisting of aqueous sulfuric acid and aqueous phosphoric acid.

5. The electrochemical cell of claim 3 wherein M is selected from the group consisting of Eu, Ce, Ho, Dy and Sm.

6. The electrochemical cell of claim 5 wherein M is cerium.

7. The electrochemical cell of claim 6 wherein $x$ is about 0.1.

8. A fuel cell as in claim 4 wherein M is cerium.

9. A method of anodically oxidizing a fluid fuel in a fuel cell having an anode consisting essentially of an electrically conductive base support and an anodic oxidation catalyst having the formula:

$$M_xWO_3$$

wherein M is selected from the group consisting of Ce, Pr, Nd, Pm, Sm, Eu, Gd, Tb, Dy, Ho, Er, Tm and Yb, and $x$ has a value between 0 and 1, which comprises contacting said fuel under electrochemical oxidizing conconditions with said anode.

10. The method of claim 9 wherein said fuel is a hydrogen containing fuel.

11. The method of claim 9 wherein such fuel is hydrogen.

References Cited

UNITED STATES PATENTS

| | | | |
|---|---|---|---|
| 3,311,502 | 3/1967 | Dryden | 136—120 |
| 3,393,100 | 7/1968 | Niedrach | 136—120 |

OTHER REFERENCES

J. C. S. (London), 1949, pp. 2501–2505, Studies of Rare-earth Tungstates by R. C. Vickery.

WINSTON A. DOUGLAS, Primary Examiner

H. A. FEELEY, Assistant Examiner

U.S. Cl. X.R.

136—120; 204—291